(12) United States Patent
Lewis et al.

(10) Patent No.: US 9,982,542 B2
(45) Date of Patent: May 29, 2018

(54) AIRFOIL PLATFORM IMPINGEMENT COOLING HOLES

(71) Applicant: United Technologies Corporation, Hartford, CT (US)

(72) Inventors: Scott D. Lewis, Vernon, CT (US); Christopher Corcoran, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 313 days.

(21) Appl. No.: 14/802,459

(22) Filed: Jul. 17, 2015

(65) Prior Publication Data

US 2016/0017720 A1 Jan. 21, 2016

Related U.S. Application Data

(60) Provisional application No. 62/026,747, filed on Jul. 21, 2014.

(51) Int. Cl.
*F01D 5/18* (2006.01)

(52) U.S. Cl.
CPC ............ *F01D 5/187* (2013.01); *F01D 5/186* (2013.01); *F05D 2240/81* (2013.01); *F05D 2260/201* (2013.01); *Y02T 50/676* (2013.01)

(58) Field of Classification Search
None
See application file for complete search history.

(56) References Cited

U.S. PATENT DOCUMENTS

| 3,804,551 | A | 4/1974 | Moore |
| 5,344,283 | A | 9/1994 | Magowan et al. |
| 6,254,333 | B1 | 7/2001 | Merry |
| 7,255,536 | B2 | 8/2007 | Cunha et al. |
| 7,695,247 | B1 | 4/2010 | Liang |
| 8,087,871 | B2 | 1/2012 | Black |
| 8,517,680 | B1 | 8/2013 | Liang |
| 8,596,961 | B2 * | 12/2013 | Tibbott ................ F01D 5/188 415/115 |
| 8,622,701 | B1 | 1/2014 | Liang |
| 8,727,710 | B2 | 5/2014 | Propheter-Hinckley et al. |
| 2001/0019696 | A1 * | 9/2001 | Jones ................. F01D 5/08 416/1 |

(Continued)

FOREIGN PATENT DOCUMENTS

| EP | 1205634 | 5/2002 |
| EP | 2610436 | 7/2013 |

OTHER PUBLICATIONS

Extended European Search Report for Application No. 15177497.3 dated Dec. 4, 2015.

*Primary Examiner* — Woody Lee, Jr.
*Assistant Examiner* — Theodore Ribadeneyra
(74) *Attorney, Agent, or Firm* — Carlson, Gaskey & Olds P.C.

(57) ABSTRACT

An airfoil structure for a gas turbine engine includes an airfoil which includes a leading edge and a trailing edge. A platform is located adjacent a first end of the airfoil and includes a core passage that extends through the platform, a mate-face for engaging an adjacent airfoil structure and a set of impingement cooling holes in communication with the core passage that extend through the mate-face adjacent the trialing edge of the airfoil.

18 Claims, 4 Drawing Sheets

(56) References Cited

U.S. PATENT DOCUMENTS

| | | | |
|---|---|---|---|
| 2005/0100437 A1 | 5/2005 | Phillips et al. | |
| 2006/0269409 A1* | 11/2006 | Torii | F01D 5/187 |
| | | | 416/97 R |
| 2008/0240927 A1* | 10/2008 | Bergander | F01D 5/18 |
| | | | 416/97 R |
| 2009/0060712 A1 | 3/2009 | DeCardenas | |
| 2011/0123310 A1* | 5/2011 | Beattie | F01D 5/18 |
| | | | 415/115 |
| 2013/0004320 A1 | 1/2013 | Perret et al. | |
| 2013/0171003 A1* | 7/2013 | Ellis | F01D 5/187 |
| | | | 416/97 R |
| 2013/0171005 A1* | 7/2013 | Ellis | F01D 5/187 |
| | | | 416/97 R |
| 2014/0000287 A1* | 1/2014 | Spangler | F01D 25/12 |
| | | | 60/806 |
| 2014/0064984 A1 | 3/2014 | Zhang et al. | |

\* cited by examiner

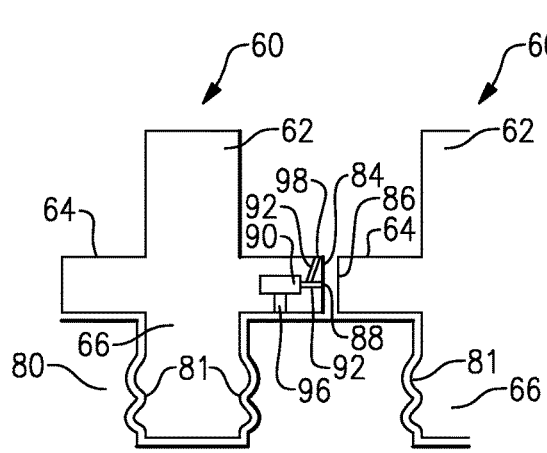
FIG.4
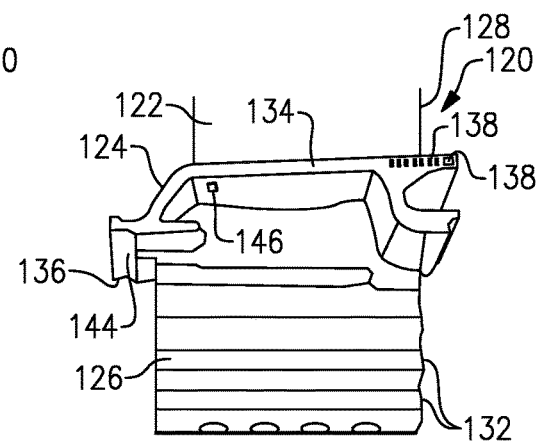
FIG.6
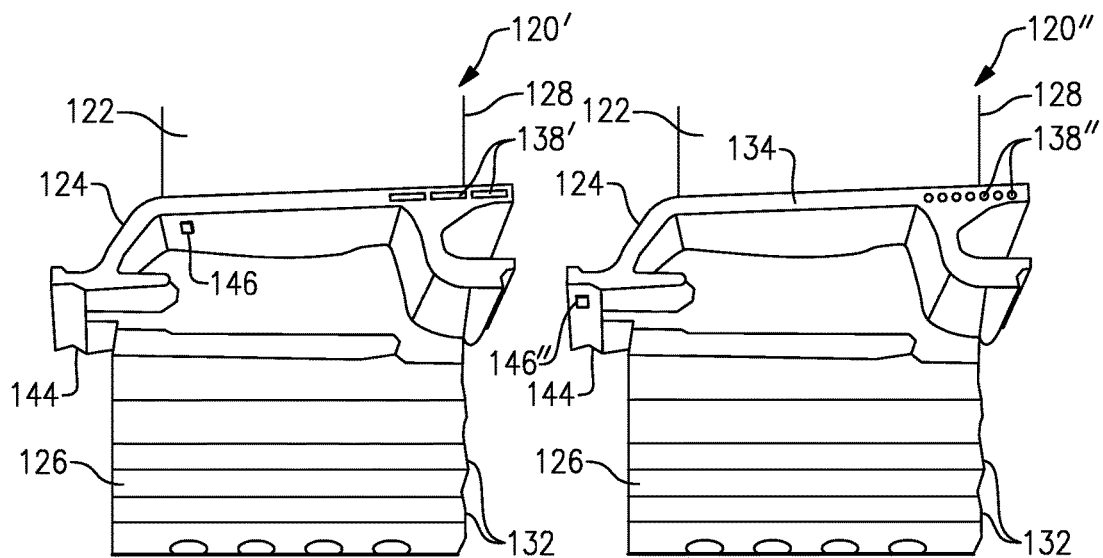
FIG.8
FIG.9

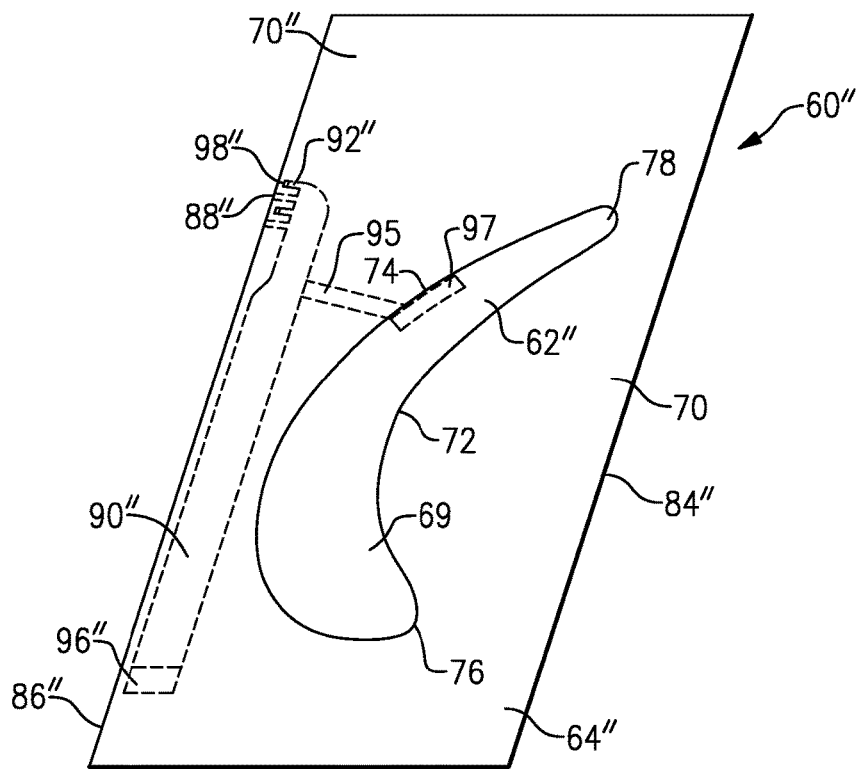
FIG.5
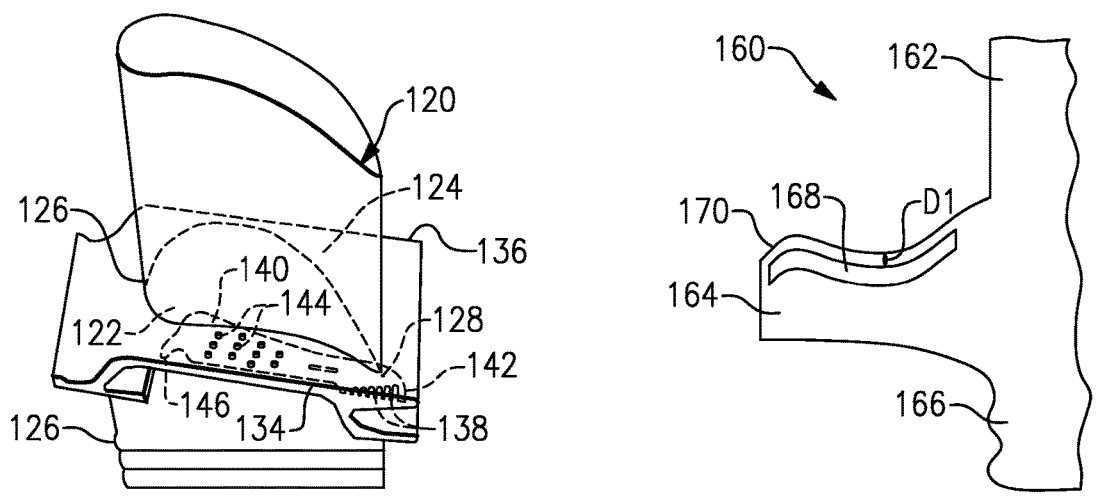
FIG.7
FIG.10

AIRFOIL PLATFORM IMPINGEMENT COOLING HOLES

CROSS-REFERENCE TO RELATED APPLICATIONS

This application claims priority to U.S. Provisional Application No. 62/026,747 which was filed on Jul. 21, 2014 and is incorporated herein by reference.

STATEMENT REGARDING FEDERALLY SPONSORED RESEARCH OR DEVELOPMENT

This invention was made with government support under Contract No. FA8650-09-D-2923-0021, awarded by the Air Force. The Government has certain rights in this invention.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Airfoils used on vanes and blades in the turbine section are exposed to high temperature, high-speed exhaust gas flow. A stream of cooling airflow is therefore often provided along exposed surfaces of the airfoils because the temperature of the exhaust gas flow is generally higher than the melting temperature of the airfoil material. Cooling channels within the airfoil communicate cooling air to openings to generate the desired cooling airflow.

Airfoils are typically molded parts and the internal cavities and passages required to communicate cooling airflow are provided by core assemblies over-molded during a molding process. Therefore, there is a need to efficiently cool airfoils exposed to the high temperature, high-speed exhaust gas flow.

SUMMARY

In one exemplary embodiment, an airfoil structure for a gas turbine engine includes an airfoil which includes a leading edge and a trailing edge. A platform is located adjacent a first end of the airfoil and includes a core passage that extends through the platform, a mate-face for engaging an adjacent airfoil structure and a set of impingement cooling holes in communication with the core passage that extend through the mate-face adjacent the trialing edge of the airfoil.

In a further embodiment of the above, an inlet to the core passage is located on a radially inner side of the platform axially upstream of the core passage spaced from the airfoil.

In a further embodiment of any of the above, at least one of the set of impingement cooling holes is located downstream of the trailing edge of the airfoil.

In a further embodiment of any of the above, the mate-face is located on a pressure side of the platform.

In a further embodiment of any of the above, the mate-face is located on a suction side of the platform.

In a further embodiment of any of the above, a set of platform film cooling holes extend through a radially outer surface of the platform adjacent the set of impingement cooling holes.

In a further embodiment of any of the above, the set of platform film cooling holes are axially offset from the set of impingement cooling holes.

In a further embodiment of any of the above, the set of impingement cooling holes are located in an axial downstream half of the platform.

In a further embodiment of any of the above, the core passage includes multiple heat transfer augmentation elements.

In a further embodiment of any of the above, the airfoil includes at least one cooling passage that is in communication with the core passage of airflow extending through the platform.

In a further embodiment of any of the above, a dedicated inlet passage is located upstream of the core passage in the platform. The dedicated inlet passage is in fluid communication with a core airfoil source.

In a further embodiment of any of the above, the core platform is maintained at a substantially constant distance from the platform.

In another exemplary embodiment, a gas turbine engine includes an airfoil that includes a leading edge and a trailing edge. A platform is located adjacent a first end of the airfoil and includes a core passage that extending through the platform, a mate-face for engaging an adjacent airfoil structure and a set of impingement cooling holes that are in communication with the core passage extending through the mate-face.

In a further embodiment of the above, the set of impingement cooling holes are generally axially aligned with the trailing edge of the airfoil.

In a further embodiment of any of the above, a set of platform film cooling holes extend through a radially outer surface of the platform adjacent the set of impingement cooling holes.

In a further embodiment of any of the above, an inlet is located on a radially inner side of the platform axially upstream of the core passage.

In another exemplary embodiment, a method of cooling an airfoil includes directing cooling air through a core passage in a platform of an airfoil and directing the cooling air form the core passage through impingement passages to a set of impingement cooling holes on a mate-face of the platform.

In a further embodiment of the above, the cooling air is secondary leakage air.

In a further embodiment of any of the above, the set of impingement holes are generally axially aligned with the trailing edge of the airfoil.

In a further embodiment of any of the above, a set of platform film cooling holes extend through a radially outer surface of the platform adjacent the set of impingement cooling holes.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 4 illustrates an axial view of adjacent airfoil structures.

FIG. 5 illustrates yet another embodiment of the airfoil structure of FIG. 2.

FIG. 6 illustrates a perspective view of another example airfoil structure.

FIG. 7 illustrates another perspective view of the airfoil structure of FIG. 6.

FIG. 8 illustrates a perspective view of another embodiment of the airfoil structure of FIG. 6.

FIG. 9 illustrates a perspective view of yet another embodiment of the airfoil structure of FIG. 6.

FIG. 10 illustrates a cross-section view of an example platform.

DETAILED DESCRIPTION

Figure 1:
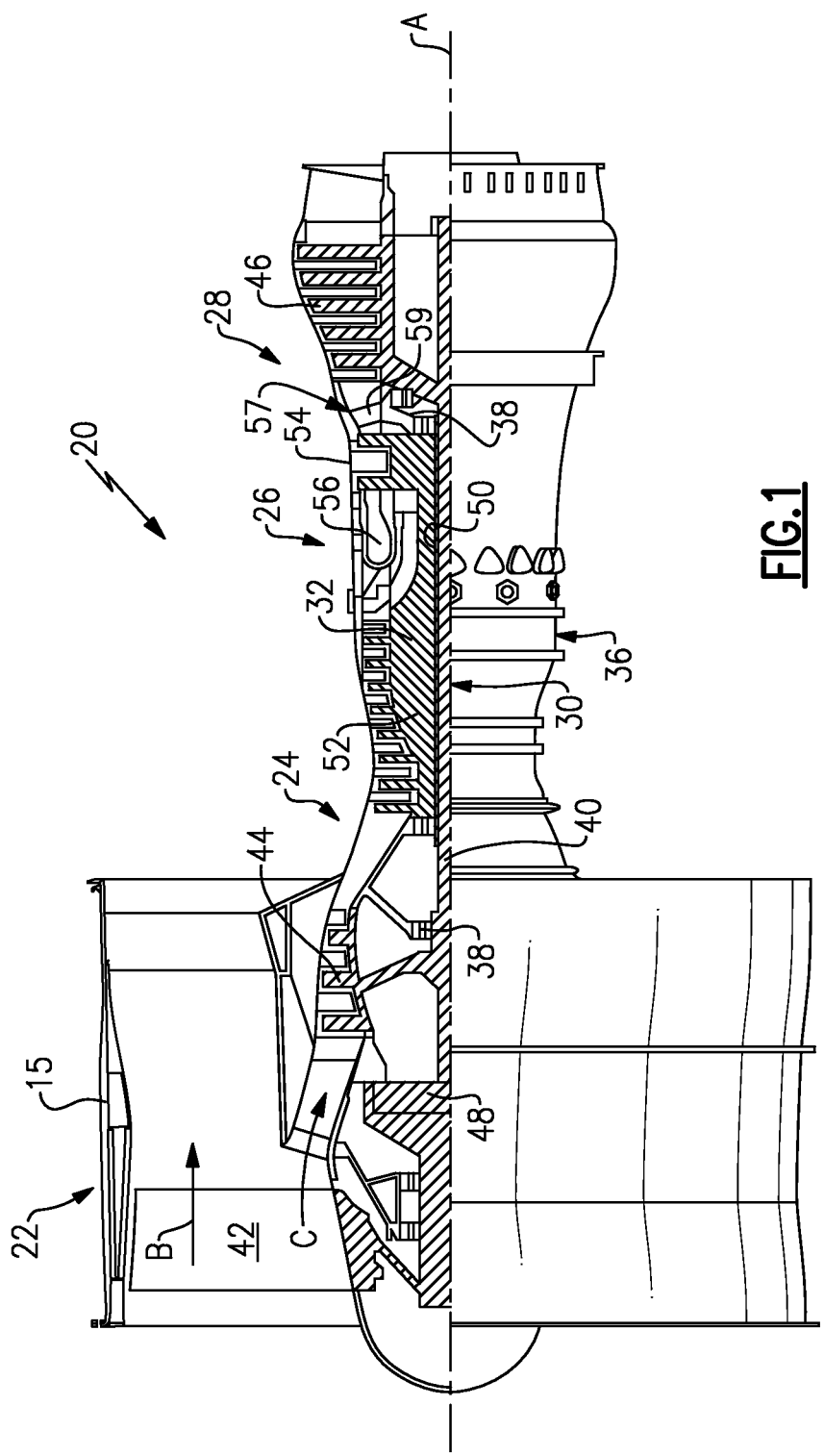
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
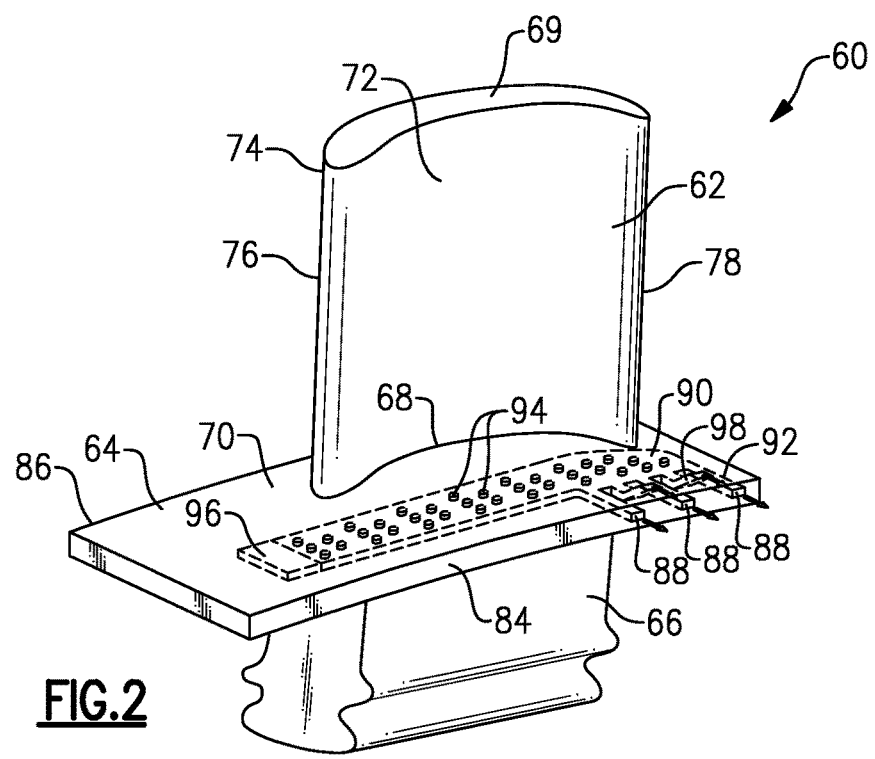
FIG. 2 illustrates a perspective view of an example airfoil structure.

FIG. 2 illustrates an example airfoil structure 60 including an airfoil 62, and a platform 64, and optionally a root portion 66. In the illustrated example, the airfoil structure 60 is a blade, however, the disclosure would also apply to a vane. The airfoil structure 60 includes a pressure side 72 and a suction side 74 separated by a leading edge 76 and a trailing edge 78. The pressure side 72 of the airfoil structure 60 is generally concave and the opposing suction side 74 is generally convex. A first airfoil end 68 is rigidly attached to a radially outer side 70 of the platform 64 and a second airfoil end 69 is spaced from the platform 64.

The platform 64 forms an inner boundary layer for working gas path fluid traveling over the airfoil structure 60. The root portion 66 extends radially inward from the platform 64 to retain the airfoil structure 60 to a rotor 80 (FIG. 4). The root portion 66 is located on an opposite side of the platform 64 from the airfoil 62 and includes ribs 82 for engaging complimentary shaped receptacles 81 on the rotor 80.

The platform 64 includes a pressure side mate-face 84 for engaging a suction side mate-face 86 on an adjacent airfoil structure 60 (FIG. 4). Mate-face impingement cooling holes 88 direct cooling air in a circumferential direction to cool the pressure side mate-face 84 and the suction side mate-face 86. The impingement cooling holes 88 are located radially upstream and downstream of the trailing edge 78. Platform film cooling holes 98 are located in a radially outer surface of the platform 64 and are directed in a radially outward direction towards the pressure side mate-face 84.

Each of the mate-face impingement cooling holes 88 and the platform film cooling holes 98 are in communication with a core passage 90 through impingement cooling passages 92. The mate-face impingement cooling holes 88 are located radially inward from the platform film cooling holes 98. In the illustrated example, the mate-face impingement cooling holes 88 are axially separated from each other by at least one platform film cooling holes 98 such that the mate-face impingement cooling holes 88 and the platform film cooling holes 98 are located in an alternating axial arrangement.

The core passage 90 extends in an axial direction and includes heat transfer elements 94, such as pedestals, turbulators, or heat augmentation ribs, for increasing the conductive heat transfer between the cooling fluid passing through the core passage 90 and the platform 64. The cooling fluid is supplied to the core passage 90 though an inlet 96.

In the illustrated example, the inlet 96 into the core passage 90 is located towards a leading edge of the platform 64 and extends though a radially inner side of the platform 64. The inlet 96 allows secondary leakage air from the gas turbine engine 20 to enter the core passage 96 without providing an additional pressurized cooling flow path directly to the core passage 90. Therefore, the core passage 90 is fluidly separated from any cooling fluid passages extending through the airfoil 62. The inlet 96 is located towards the leading edge of the platform 64 to allow the higher pressure secondary leakage air to enter the inlet 96 and travel though the core passage 90 with sufficient pressure to overcome the hot gas flow entering between the pressure side mate-face 84 and the suction side mate-face 86.

Figure 3:
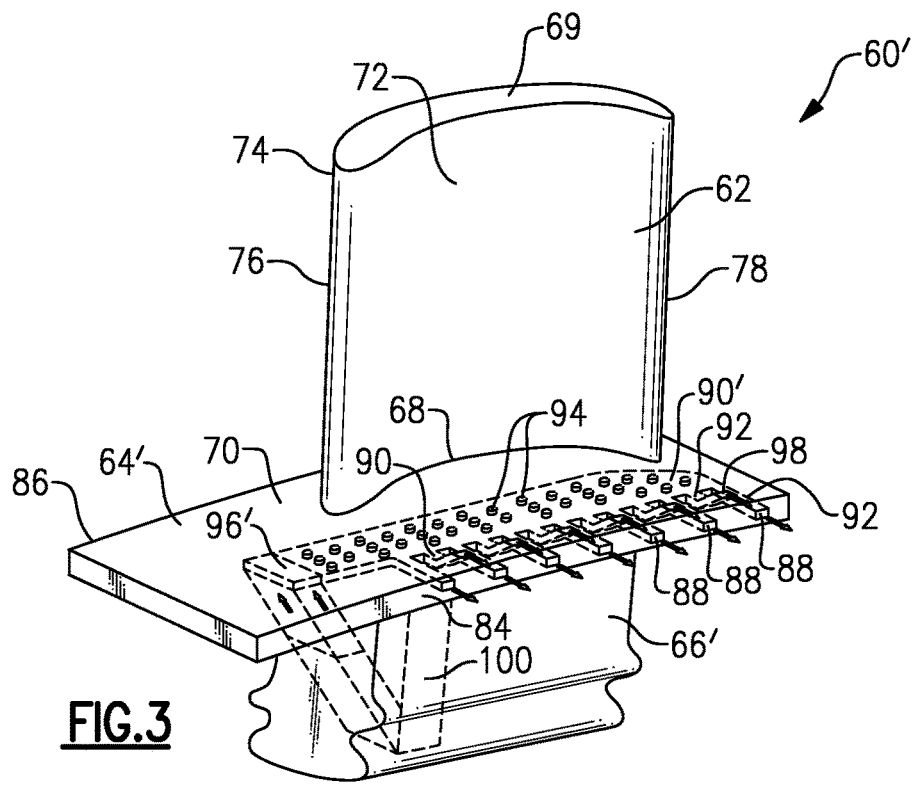
FIG. 3 illustrates a perspective view of another embodiment of the airfoil structure of FIG. 2.

FIG. 3 illustrates another example airfoil structure 60'. The example airfoil structure 60' is similar to the airfoil structure 60 except where described below or shown in FIG. 3. The platform 64' includes additional mate-face impingement cooling holes 88 and platform film cooling holes 98 extending towards the leading edge of the platform 64. In one example, the platform film cooling holes 98 and the mate-face impingement cooling holes 88 extend from the trailing edge of the platform 64' along the pressure side mate-face 84 at least to an axial midpoint of platform 64'. In another example, the platform film cooling holes 98 and the mate-face impingement cooling holes 88 extend from the trailing edge of the platform 64' along at least 60% of the axial length of the platform 64'.

An inlet 96' fluidly connects a core passage 90' with an airfoil cooling passage 100 extending through the root portion 66' to provide pressurized cooling air to internal passages in the airfoil 62. The core passage 90' is in communication with the airfoil cooling passage 100 to provide sufficient pressure to overcome the gas flow pressure entering between the pressure side mate-face 84 and the suction side mate-face 86 due to the pressure loss from the additional platform film cooling holes 98 and the additional mate-face impingement cooling holes 88.

FIG. 5 illustrates yet another airfoil structure 60". The airfoil structure 60" is similar to the airfoil structure 60 except where described below or shown in the drawings. A core passage 90" is located adjacent the suction side mate-face 86" and is in fluid communication with an inlet 96" Impingement cooling passages 92" connect the core passage 90" with mate-face impingement cooling holes 88" on the suction side mate-face 86" and platform film cooling holes 98" located on a radially outer side 70" of the platform 64".

A core passage bleed outlet 95 connects the core passage 90" with airfoil cooling passages 97 in the airfoil 62" to allow excess cooling air to travel from the core passage 90" to the airfoil cooling passages 97.

FIG. 6 illustrates an airfoil structure 120 including an airfoil 122, a platform 124, and a root portion 126. The platform 124 is located at a first end of the airfoil 122 and forms an inner boundary layer for working fluid passing over the airfoil structure 120. An overhang 144 is located at a leading edge of the platform 124. The root portion 126 extends radially inward from the platform 124 to retain the airfoil structure 120 to the rotor 80 (FIG. 4). The root portion 126 is located on an opposite side of the platform 124 from the airfoil 122 and includes ribs 132 for engaging complimentary shaped receptacles 81 on the rotor 80 (FIG. 4).

The platform 124 includes a pressure side mate-face 134 for engaging a suction side mate-face 136 on an adjacent airfoil structure 120. Square and/or rectangular mate-face impingement cooling holes 138 direct cooling air in a circumferential direction to cool the pressure side mate-face 134 and the suction side mate-face 136 on the adjacent airfoil structure 120.

As shown in FIG. 7, the mate-face impingement cooling holes 138 are in communication with a core passage 140 through impingement cooling passages 142. The core passage 140 includes multiple heat transfer elements 144 for increasing the conductive heat transfer of the cooling fluid passing through the core passage 140. The cooling fluid enters the core passage 140 though an inlet 146. In this example, the inlet 146 is located in an upstream portion of the airfoil structure 120 and extends though a radially inner side of the platform 124 to allow secondary leakage air to enter the inlet 146.

The inlet 146 is located in an axially upstream portion of the platform 124 in order to allow the high pressure secondary leakage air to travel though the core passage 140 (FIGS. 6 and 7) with sufficient pressure to overcome the gas flow entering between the pressure side mate-face 134 and the suction side mate-face 136. The core passage 140 is fluidly separated from any cooling fluid passages extending through the airfoil 122.

FIG. 8 illustrates another example airfoil structure 120'. The airfoil structure 120' is similar to the airfoil structure 120 except where described below or shown in the Figures. Mate-face impingement cooling holes 138' are rectangular and generally axially aligned with a trialing edge 128 of the airfoil 122.

FIG. 9 illustrates yet another example airfoil structure 120". The airfoil structure 120" is similar to the airfoil structure 120 except were described below or shown in the Figures. In this example, mate-face impingement cooling holes 138" are circular and located adjacent and generally axially aligned with the trailing edge 128 on the airfoil 122. An inlet 146" to the core passage 140 is located in the overhang 144 on the platform 124 on the radially inner side.

FIG. 10 illustrates example airfoil structure 160. The airfoil structure 160 is similar to the airfoil structure 60 except where described below or shown in the Figures. The airfoil structure 160 includes an airfoil 162, a platform 164, and a root portion 166. The platform 164 includes a contoured surface 170 on a radially outer side of the platform 164. The contoured surface includes a variable radial dimension in the circumferential direction from the axis of the gas turbine engine 20. A core passage 168 extends through the platform 164 and maintains a substantially constant distance D1 from the contoured surface 170 such that the core passage 168 also includes a variable radial dimension in the circumferential direction from the axis of the gas turbine engine 20. By maintaining the constant distance D1, the platform 164 is more evenly cooled to prevent hot and cold spots along the contoured surface 170.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. An airfoil structure for a gas turbine engine comprising:
   an airfoil including a leading edge and a trailing edge; and
   a platform located adjacent a first end of the airfoil, and including:
      a core passage extending through the platform, wherein the airfoil includes at least one cooling passage in communication with the core passage of airflow extending through the platform;
      a mate-face for engaging an adjacent airfoil structure;
      a set of impingement cooling holes in communication with the core passage extending through the mate-face adjacent the trailing edge of the airfoil; and
      a set of platform film cooling holes extending through a radially outer surface of a pressure side of the platform adjacent the set of impingement cooling holes.

2. The airfoil structure of claim 1, further comprising an inlet to the core passage located on a radially inner side of the platform axially upstream of the core passage spaced from the airfoil.

3. The airfoil structure of claim 1, wherein at least one of the set of impingement cooling holes is located downstream of the trailing edge of the airfoil.

4. The airfoil structure of claim 1, wherein the mate-face is located on a pressure side of the platform.

5. The airfoil structure of claim 1, wherein the mate-face is located on a suction side of the platform.

6. The airfoil structure of claim 1, wherein the set of platform film cooling holes are axially offset and in an alternating arrangement from the set of impingement cooling holes.

7. The airfoil structure of claim 6, wherein the set of impingement cooling holes are located in an axial downstream half of the platform.

8. The airfoil structure of claim 1, wherein the core passage includes multiple heat transfer augmentation elements.

9. The airfoil structure of claim 1, further comprising a dedicated inlet passage located upstream of the core passage in the platform, the dedicated inlet passage is in fluid communication with a core airfoil source.

10. The airfoil structure of claim 1, wherein the core passage is maintained at a substantially constant distance from the platform.

11. The airfoil structure of claim 1, further comprising an inlet to the core passage located on a radially inner side of the platform axially upstream of the core passage spaced from the airfoil with the core passage including multiple pedestals, wherein at least one of the set of impingement cooling holes is located downstream of the trailing edge of the airfoil and the mate-face is located on a pressure side of the platform.

12. A gas turbine engine comprising:
   an airfoil including a leading edge and a trailing edge; and
   a platform located adjacent a first end of the airfoil, and including:
      a core passage extending through the platform, wherein the airfoil includes at least one cooling passage in communication with the core passage of airflow extending through the platform;
      a mate-face for engaging an adjacent airfoil structure;
      a set of impingement cooling holes in communication with the core passage extending through the mate-face; and
      a set of platform film cooling holes extending through a radially outer surface of a pressure side of the platform adjacent the set of impingement cooling holes.

13. The gas turbine engine of claim 12, wherein the set of impingement cooling holes are generally axially aligned with the trailing edge of the airfoil.

14. The gas turbine engine of claim 12, further comprising an inlet located on a radially inner side of the platform axially upstream of the core passage.

15. The gas turbine engine of claim 12, wherein the set of platform film cooling holes are axially offset and in an alternating arrangement from the set of impingement cooling holes.

16. A method of cooling an airfoil comprising:
   directing cooling air through a core passage in a platform of an airfoil, wherein the cooling air is secondary leakage air;
   directing the cooling air from the core passage through impingement passages to a set of impingement cooling holes on a mate-face of the platform; and
   directing cooling air from the core passage through a set of platform film cooling holes extending through a radially outer surface of a pressure side of the platform adjacent the set of impingement cooling holes.

17. The method of claim 16, wherein the set of impingement holes are generally axially aligned with the trailing edge of the airfoil.

18. The method of claim 16, wherein the set of platform film cooling holes are axially offset and in an alternating arrangement from the set of impingement cooling holes.

* * * * *